United States Patent [19]

McCloskey

[11] 3,992,066

[45] Nov. 16, 1976

[54] SPHERICAL BEARINGS AND PARTS THEREFOR

[75] Inventor: Albert R. McCloskey, Fairfield, Conn.

[73] Assignee: The Heim Universal Corporation, Fairfield, Conn.

[22] Filed: Apr. 3, 1975

[21] Appl. No.: 564,955

Related U.S. Application Data

[62] Division of Ser. No. 499,940, Aug. 23, 1974, Pat. No. 3,900,294.

[52] U.S. Cl. ............................. 308/72; 29/149.5 R
[51] Int. Cl.² ........................................ F16C 23/00
[58] Field of Search ...................... 308/72, 207 R; 29/149.5

[56] References Cited
UNITED STATES PATENTS

| | | | |
|---|---|---|---|
| 2,380,150 | 7/1945 | Collito | 308/72 |
| 2,478,660 | 8/1949 | Keahey | 308/72 |
| 2,781,238 | 2/1957 | Carter | 308/72 |
| 2,804,679 | 9/1957 | Tracy | 308/72 |
| 3,161,445 | 12/1964 | Haller | 308/72 |
| 3,252,742 | 5/1966 | Swanstrom | 308/72 |
| 3,342,513 | 9/1967 | Melton et al. | 308/72 |
| 3,351,999 | 11/1967 | McCloskey | 308/72 |
| 3,420,587 | 1/1969 | Straub | 308/72 |
| 3,656,821 | 4/1972 | McCloskey et al. | 308/72 |
| 3,700,295 | 10/1972 | Butzow et al. | 308/72 |

*Primary Examiner*—M. H. Wood, Jr.
*Assistant Examiner*—Gene A. Church
*Attorney, Agent, or Firm*—James C. Wray

[57] ABSTRACT

A method of manufacturing a spherical bearing rod end having an outer race member, an intermediate member of yieldable material within and supported by said outer race member and an inner race operationally supported by said intermediate member comprising preforming a rod end blank having a ball-like section at one end thereof, flattening the spherical section to form two enlarged faces, each face having an inwardly disposed annular dished portion whereby the material flows uniformly to the outer periphery of the faces to form a uniformly cold formed annular area, removing the inwardly disposed annular dished portion to form a bore through said faces thereby leaving said uniformly cold formed annular area to serve as the outer member, inserting in said bore said intermediate member and said inner race member, interlocking with mechanical interlocking means said intermediate member and inner race member within said bore to effect the bearing support of said inner race member within said intermediate member.

3 Claims, 11 Drawing Figures

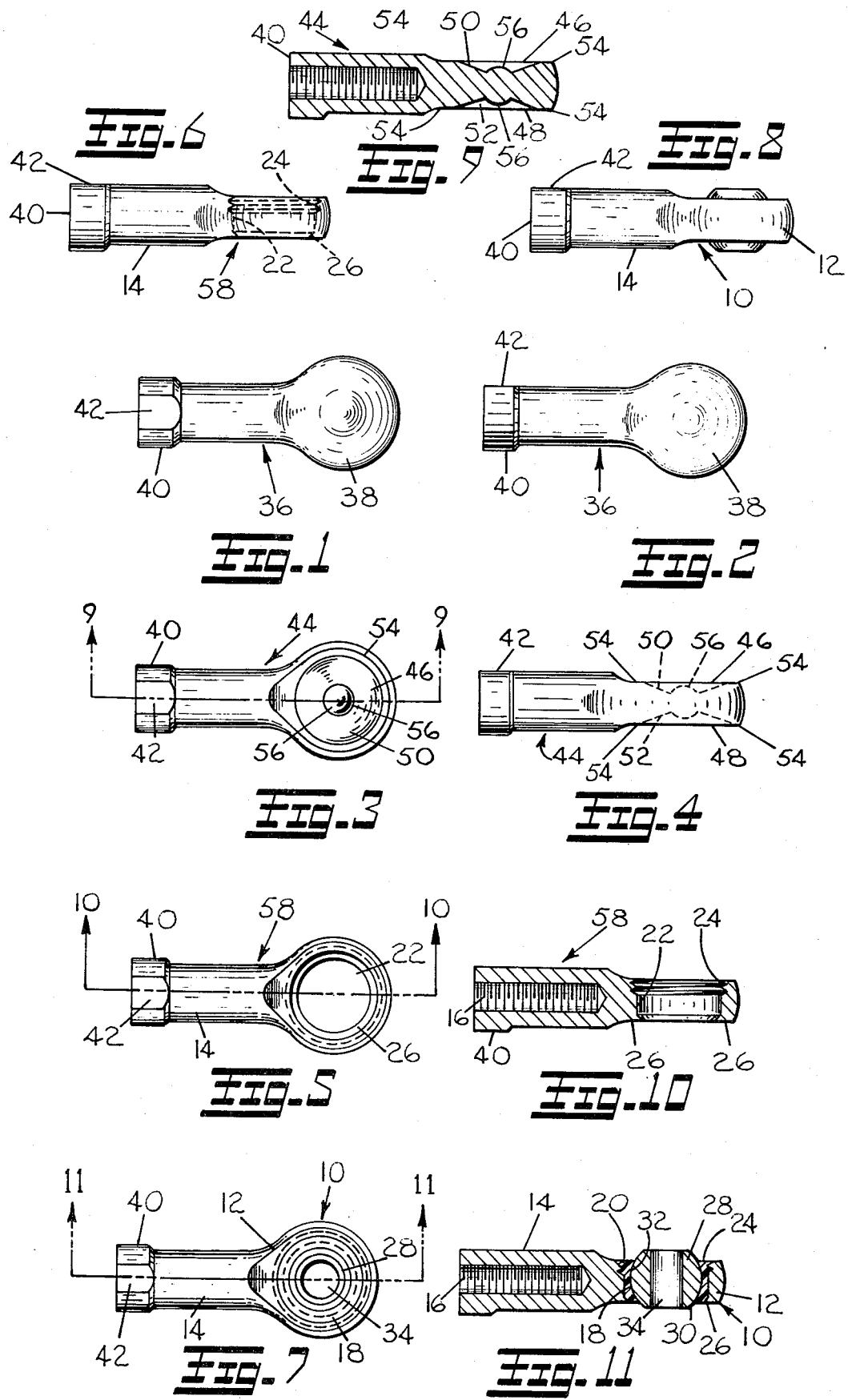

SPHERICAL BEARINGS AND PARTS THEREFOR

This is a division of application Ser. No. 499,940, filed Aug. 23, 1974, now U.S. Pat. No. 3,900,294.

BACKGROUND OF THE INVENTION

This invention relates the method of manufacturing spherical rod end bearings having male or female end connections.

In particular, the present invention relates to a method of manufacturing a spherical rod end bearing having an outer member, an intermediate member of yieldable material within and supported by said outer member and an inner race operationally supported by said intermediate member comprising preforming a rod end blank having a ball-like section at one end thereof, flattening the ball-like or ellipsoidal section to form two enlarged faces, each face having an inwardly disposed annular dished portion whereby the material flows uniformly to the outer periphery of the faces to form a uniformly cold formed annular area, removing the inwardly disposed annular dished portion to form a bore through said faces thereby leaving said uniformly cold formed annular area to serve as the outer race member, inserting in said bore said intermediate member and said inner race member, interlocking with mechanical interlocking means said intermediate member and inner race member within said bore to effect the bearing support of said inner race member within said intermediate member.

The prior methods of manufacture of rod end spherical bearings typical includes the forming of spherical member at the end of a rod end blank. The spherical member of the rod end blank is then straddle milled to doubly truncate the spherical end section to generate the "banjo" at the end thereof. This prior art approach requires a number of additional manufacturing steps requiring the use of very expensive machine tools operated by highly skilled and paid machinists.

Additionally, this prior art approach results in a waste of material which end up in a scrap pile in the form of metal shavings. Also, larger types of blank material must be used and stocked.

There have been some attempts to overcome the objections of the prior art including different forming methods using different types of expensive preformed rod end blanks and expensive and complicated dies. An example of such an approach may be found in U.S. Pat. No. 3,248,776 to Brewster, patented May 3, 1966. The Brewster patent is directed to a method of making a self-aligning rod end bearing in which, along other things a spherically enlarged head is formed at one end of a blank, the head is flattened and a cylindrical bore is formed in the flattened end. The inner race member, i.e. the spherical ball, is then placed within the bore opening in "banjo" face and material of the face is coined around the ball to engage and surround the ball. In this method the ball is used as a die and is subjected to the full force of the forming process. Further, the tolerances between the outer race member and inner race member of Brewster would be difficult if not impossible to control. Additionally the outer race member is further deformed by the coining step which might adversely effect its physical characteristics.

The segment of the prior art as typified by Brewster, may be therefore described as a method of manufacturing spherical bearings which is difficult to control and results in a bearing product of dubious quality.

SUMMARY OF THE INVENTION

It is therefore, a primary object of the present invention to provide a method of manufacturing a spherical rod end bearing having an outer member, an intermediate member of yieldable material within and supported by said outer member and an inner race operationally supported by said intermediate member comprising preforming a rod end blank having a ball-like section at one end thereof, flattening the spherical section to form two enlarged faces, each face having an inwardly disposed annular dished portion whereby the material flows uniformly to the outer periphery of the faces to form a uniformly cold formed annular area, removing the inwardly disposed annular dished portion to form a bore through said faces thereby leaving said uniformly cold formed annular area to serve as the outer race member, inserting in said bore said intermediate member and said inner race member, interlocking with mechanical interlocking means said intermediate member and inner race member within said bore to effect the bearing support of said inner race member within said intermediate member.

It is another object of the present invention to provide a method of manufacturing a rod end bearing in which the outer flow of material caused by the flattening of the ball-like section is restrained by restraining dies.

It is still another object of the present invention to provide a method of manufacturing a rod end bearing in which any excess of material of the ball-like section which is not needed to form the two faces is allowed to flow to the center of the faces to form a centrally disposed dimple thereon.

A further object of the present invention is to provide a method of manufacturing a rod end bearing in which the inwardly disposed annular dished portion is removed by machining.

An additional object of the present invention is to provide a method of manufacturing a rod end bearing in which the interlocking means includes at least one annular rib on the inner surface of the bore and at least one complementary annular groove on the outer surface of the intermediate member, the annular rib adapted to fit within the annular groove.

It is yet another object of the present invention to provide a method of manufacturing a rod end bearing in which the intermediate member is fabricated from a self-lubricating plastic material such as DELRIN (Trademark of DuPont).

It is still another object of the present invention to provide a method of manufacturing a spherical bearing rod end in which it is readily adaptable to the manufacturing of male (externally threaded) or female (internally threaded) rod end spherical bearings.

It is a further object of the present invention to provide a method of manufacturing a spherical bearing rod end which utilized simple machine operations resulting in a high quality bearing product without any undue waste of material.

It is still another object of the present invention to provide a method of manufacturing a rod end bearing which may be readily adapted to high volume automated manufacturing techniques.

Other objects and advantages of the invention will become apparent as the present invention is better understood from the following disclosure and as shown in the accompanying drawings.

DESCRIPTION OF THE DRAWINGS

FIG. 1 is a top view in elevation of the spherical bearing rod end blanks employed in the method of the present invention;

FIG. 2 is a side view of the spherical bearing rod end blank of FIG. 1;

FIG. 3 is a top view in elevation of the spherical bearing rod end blank of FIG. 1 in which the ball-like section at the end thereof is flattened;

FIG. 4 is a partial phantom side view of the flattened rod end spherical bearing blank of FIG. 3;

FIG. 5 is a top view in elevation of the spherical bearing rod end blank with the inwardly disposed annular dished portion removed;

FIG. 6 is a partial phantom side view of the spherical bearing rod end blank of FIG. 5;

FIG. 7 is a top view in elevation of an assembled spherical bearing rod end manufactured in accordance with the present invention employing the rod end blank of FIG. 5;

FIG. 8 is a side view of the assembled spherical bearing rod end of FIG. 7;

FIG. 9 is a sectional view of thy rod end blank of FIG. 3 taken along line 9—9 thereon;

FIG. 10 is a sectional view of the rod end blank of FIG. 5 taken along line 10—10 thereon; and FIG. 11 is a sectional view of the assembled spherical bearing rod end of FIG. 7 taken along line 11—11 thereon.

DESCRIPTION OF THE PREFERRED EMBODIMENTS

Referring now to the drawings and in particular FIGS. 7, 8 and 11, there is shown a spherical bearing rod end generally designated by numeral 10. The spherical bearing rod end 10, which is of the female type, is generally of the type of bearing which may be manufactured in accordance with the present invention. The overall structured configuration of spherical bearing rod end 10 is as disclosed in my prior U.S. Pat. No. 3,656,821, patented Apr. 18, 1974 and entitled "Self-Aligning Bearing."

The bearing 10 is provided with an outer race member 12 which has a rod extension 14. The extension 14 is internally threaded with threads 16 making it of the female variety. Of course, the present invention is equally applicable to externally threaded (male) rod end bearings.

The rod end 10 is provided with an intermediate member 20 which may be of yieldable material such as plastic or brass or the like. The intermediate member 18 is provided with at least one annular rib 20 on its outer surface. The rib 20 may be molded on the outer surface or may be machined thereon.

The intermediate member 18 is adapted and so sized to be placed in registration with the bore 22 provided in the outer race member 12. As can be seen in FIG. 10, the bore 22 is partially cylindrical in form or shape and is provided with at least one annular groove 24. At the end of the bore 22 opposite the annular groove 24 there is provided an annular lip 26 which integral with the outer race member 12.

When the intermediate member 18 is inserted within the outer member, in a manner to be later described, the end thereof will abut the annular lip 26, thereby fixing the axial position of the intermediate member 18 which is further fixed and interlocked with the outer race member 12 by the registration of the annular rib 20 in the annular groove 24. This interlocking arrangement is maintained by the presence of the inner race member 28 enclosed within the intermediate member 18.

The concave inner surface 30 of the intermediate member 18 provides the bearing surface for the inner race member 28 which has a complementary convex outer surface 32. The inner race member 28 is provided with a central bore 34 for operational connection to an associated apparatus or device (not shown).

The intermediate member 18 could, of course, be configured differently particularly at its outer surface and yet provide the necessary elements to practice the method to be particularized below. For example, its outer surface could be provided with annular grooves in which annular ribs on the inner surface of the outer race member could be disposed to interlock the intermediate member therein.

Referring now to the method as contemplated by the present invention and in particular to FIGS. 1 through 6 and FIGS. 9 and 10 there is shown a rod end blank which ultimately comprises the outer member 12 of the bearing 10.

In FIGS. 1 and 2 there is shown a rod end blank 36 which is provided with a ball-like section 38 at one end thereof. The rod end blank may be provided with a nut end portion 40 which has flats 42 which may be engaged by a wrench or other tool for operationally attaching the completed bearing to a device or apparatus (not shown). As the rod end blanks proceed through the various steps these features do not materially change and, accordingly they will not be referred to again and they will be designated by the same numerals throughout the description.

The rod end blank 36 may be formed on a screw machine or the like and may be manufactured from suitable steel such as C1018 or C1215 steel. The rod end blank 36 may be also annealed to improve its forming properties and reduce the possibility of cracking or the like during deformation.

The rod end blank 36 is transformed into the rod end blank 44 by the flattening of the ball-like section 38 by die means (not shown). The rod end blank 44 is best shown in FIGS. 3 and 4 and the sectional view of FIG. 9.

The die means are so adapted to flatten the spherical section 38 such that it is comptacted and densified in one axis and grows in a radial fashion in the axis perpendicular to the aforementioned axis.

The compaction and densification of the material of the ball-like section 38 is continued until the material flows to form a first face 46 and a second face 48. Each of the faces 46 and 48 have a unique cross-section in that they both have formed thereon an inwardly disposed annular dished portion 50 and 52 respectively.

During the compaction and densification of the spherical section 38 by the die means the material thereof also flows radially outwardly to uniformly cold form an annular area 54 on the outer periphery of the faces 46 and 48.

The outward radial growth of the ball-like section 38 to form the rod end blank 44 is restrained by the die means which might include restraining dies (not shown). The restraining dies could be used to effect a uniform shape of the rod end blank 44 such that the cold formed annular area 54 would have a precisely controlled radius of curvature about the dished portion 50 and 52.

The first and second annular dished portion may inwardly terminate in a generally centrally disposed dimple 56. The dimple 56 serves as a means to locate the rod end blank 44 with respect to the dies to insure that cold formed annular area 54 has a uniform substantially circular configuration. The dimple 56 is formed by a small cavity in the dies which positionally fixes the rod end blank on the die means.

It can be seen that the rod end blank 36 of FIG. 1 has grown in overall length to the rod end blank of FIGS. 3, 4 ank 9 without necessarily disturbing the extension area of the blank or the threads therein or thereon as the case may be. Therefore, the extension area with the nut end 40 at its end may or may not be completely formed before the flattening and forming of the spherical section 38.

It can be seen therefore that the forming of the faces 46 and 48 having dished portions 50 and 52 respectively and the cold formed annular area 54 maximizes the use of the material utilized in forming the rod end blank. Further, the cold formed annular area 54 which will serve as the outer race member (in a member to be later described) comprises uniformly cold formed steel having improved tensile strength.

Additionally, a substantial savings of material is desired. For example, if it was desired to produce a rod end bearing with overall head diameter of one inch you could choose a stock size having a diameter of only thirteen sixteenths of an inch (13/16 inch). Thirteen sixteenths of an inch stock has a weight to length ratio 0.147 lbs./inch while one inch stock has a weight to length ratio of 0.223 lbs./inch which therefore comprises a 34% saving on smaller diameter stock. A further savings is also achieved by using a shorter rod end blank. It has been found that approximately a 6% saving of material is achieved in this manner. Accordingly, an overall saving of about 40% of the stock material can be achieved using the present method of manufacturing while at the same time resulting in a superior rod end blank.

The rod end blank 44 of FIGS. 3 and 4 and 9 is transformed into the rod end blank of FIGS. 5, 6 and 10 by the removal of the area contained within the cold formed annular area 54, that is, the removal of the first annular dished portion 50, the second annular dished portion 52 and the dimple 56 by means such as machining. As before discussed, the rod end blank 44 comprises essentially the outer member 12. The above removal by machining generates the outer member bore 22 which is provided, on its inner surface, with at least one annular groove 24. There is also provided within the bore 22 an annular lip 26 all of which has been before described.

It is important to note that the machining leaves the uniformly formed cold formed annular area 54 which serves as the outer member 12 which comprises an improvement on my previously mentioned U.S. Pat. No. 3,656,821 in that the outer member 12 is cold formed.

The assembled spherical bearing rod end of FIGS. 7, 8 and 11 is completed by inserting the inner race member 28 within the intermediate member 18 and inserting this subassembly within the bore 22 of the outer race member 12. The intermediate member 18, which is of yieldable material such as Delrin or brass will "snap" into place within the bore with the annular rib 20 in registration with their respective annular groove 24, the intermediate member abutting at one end thereof against the annular lip 26. The snapping or interlocking of the intermediate member 18 with the inner race member and the outer race member 12 thereby completes the bearing assembly.

Obviously, the present invention is not limited to the specific details as herein described, but is capable of other modifications and changes without departing from the spirit and scope of the appended claims.

I claim:

1. A blank for a spherical bearing rod end having an outer member, an intermediate member of yieldable material within and supported by said outer race member and an inner race operationally supported by said intermediate member, the outer member comprising having a radially outward flowed uniformly cold formed annular area having improved tensile strength and the annular area having two enlarged faces, each face having an inwardly disposed annular dished portion in which the material has been cold worked and flowed uniformly to an outer periphery of said faces to form the uniformly cold formed annular area.

2. A self-aligning bearing having an outer member with an open portion with at least one annular groove disposed therein, an inner member with a convex outer surface, and an intermediate member of preformed resilient, self-lubricating material, said intermediate member having at least one annular lip, said lip adapted to register with said annular groove in said outer member to solely mechanically restrain said intermediate member in place within said open portion of said outer member and to solely mechanically restrain said inner member for rotatable movement within said intermediate member, said intermediate member, when in its assembled position, having a spherical inner surface generally conforming to the convex outer surface of said inner member and forming the sole bearing surface for the inner member, the improvement comprising said outer member being cold formed steel and the outer member having a radially outward flowed uniformly cold formed annular area having improved tensile strength that surrounds said open portion which receives said intermediate member.

3. A self-aligning bearing having an outer member with an open portion with at least one annular lip disposed therein, an inner member with a convex outer surface, and an intermediate member of preformed resilient, self-lubricating material, said intermediate member having at least one annular groove, said lip adapted to register with said annular groove in said intermediate member to solely mechanically restrain said intermediate member in place within said open portion of said outer member and to solely mechanically restrain said inner member for rotatable movement within said intermediate member, said intermediate member, when in its assembled position, having a spherical inner surface generally conforming to the convex outer surface of said inner member and forming the sole bearing surface for the inner member, the improvement comprising said outer member being cold formed steel and the outer member having a radially outward flowed uniformly cold formed annular area having improved tensile strength that surrounds said open portion which receives said intermediate member.

* * * * *